Figure 1:
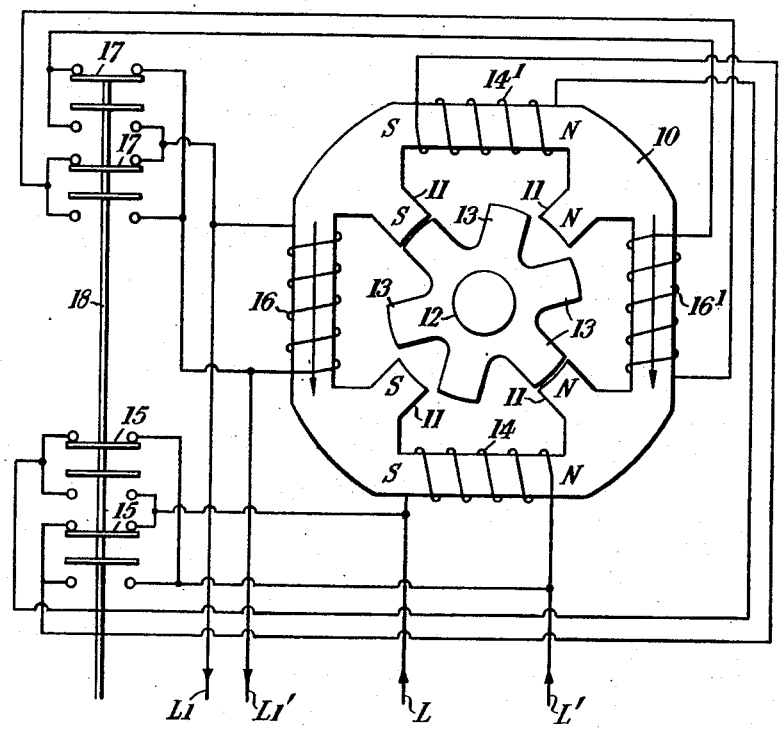

Feb. 22, 1955　　　E. J. WIGHTMAN　　　2,702,867
ELECTRICAL APPARATUS ARRANGED TO HAVE
AN ALTERNATING CURRENT OUTPUT
Filed Dec. 16, 1952　　　　　　　　　　4 Sheets-Sheet 1

INVENTOR
Eric J. Wightman
By: Watson, Cole, Grindle
& Watson
ATTORNEYS

United States Patent Office 2,702,867
Patented Feb. 22, 1955

2,702,867
ELECTRICAL APPARATUS ARRANGED TO HAVE AN ALTERNATING CURRENT OUTPUT

Eric Jeffrey Wightman, Tolworth, Surbiton, England, assignor to Vickers-Armstrongs Limited, London, England Application December 16, 1952, Serial No. 326,186

Claims priority, application Great Britain December 21, 1951

10 Claims. (Cl. 307—149)

The invention relates to improvements in electrical apparatus arranged to have an alternating current output. It is sometimes necessary to supply equipment with alternating current, either generated by an alternator driven by mechanical means, or from an existing suitable alternating current supply having the same characteristics, but supplied through a transformer. It is the object of the present invention to provide a single piece of equipment which will provide the services of either an alternator or transformer and thus produce a saving in weight and space in comparison with that required by separate items of orthodox equipment.

According to the invention, apparatus capable of functioning as an alternator comprises a stator of inductive material having a pair of field coils and a pair of output coils mounted thereon, a rotor of inductive material adapted, when rotated with D. C. applied to the field coils, to produce an alternating E. M. F. from the output of the output coils and means for reversing the polarity of one coil of each pair with respect to the other coil of that pair so that, with the rotor stationary, the application of a suitable alternating E. M. F. to the said field coils will induce an alternating E. M. F. at the output of the output coils of the same characteristics as that produced on rotation of the rotor.

The apparatus in accordance with the invention is particularly suitable for use with airborne guided missiles which contain equipment requiring a power supply obtainable prior to release from the parent aircraft, but which after release must continue to draw its power from a source within the missile. In such a case, the apparatus will be arranged to function as a transformer prior to release of the missile and as an alternator, driven by a prime mover operated by the airstream, after release of the missile.

While reference has been made above to the apparatus having a pair of output coils, it would be possible to use but a single output coil. Also, as will appear later, a number of pairs of field and output coils may be provided on the stator.

As a further alternative the A. C. input required when the apparatus is to function as a transformer may be applied to a winding other than the field coils. This separate winding may be wound on the same portion of the stator as the field coils or the output coils, or may be constituted by portions of the output coils, when the apparatus will then function as an auto-transformer. In either case, in order to switch from operation as an alternator to operation as a transformer, it is necessary to switch off the D. C. input to the field coils, to switch on the A. C. input to the additional winding and to reverse the polarity of one of the output coils, or of one of each pair of output coils.

In all cases, when the apparatus is used as a transformer no rotation of the rotor is necessary, the stator providing a continuous magnetic field under these conditions. The flux leakage across the air gaps between the rotor and the stator does not greatly affect the operation of the apparatus as a transformer.

The apparatus has the advantage that when working as a transformer it can be used to produce an alternating current output in circumstances in which a convenient source of electrical energy is available, and yet by means of a simple arrangement of the switchgear, the same alternating output can be obtained by rotation of the rotor at the correct speed.

Figure 2:
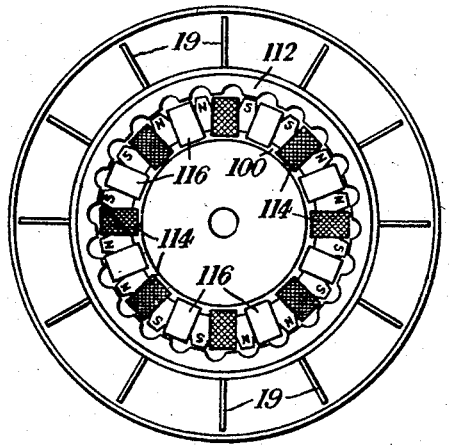
Figure 3:
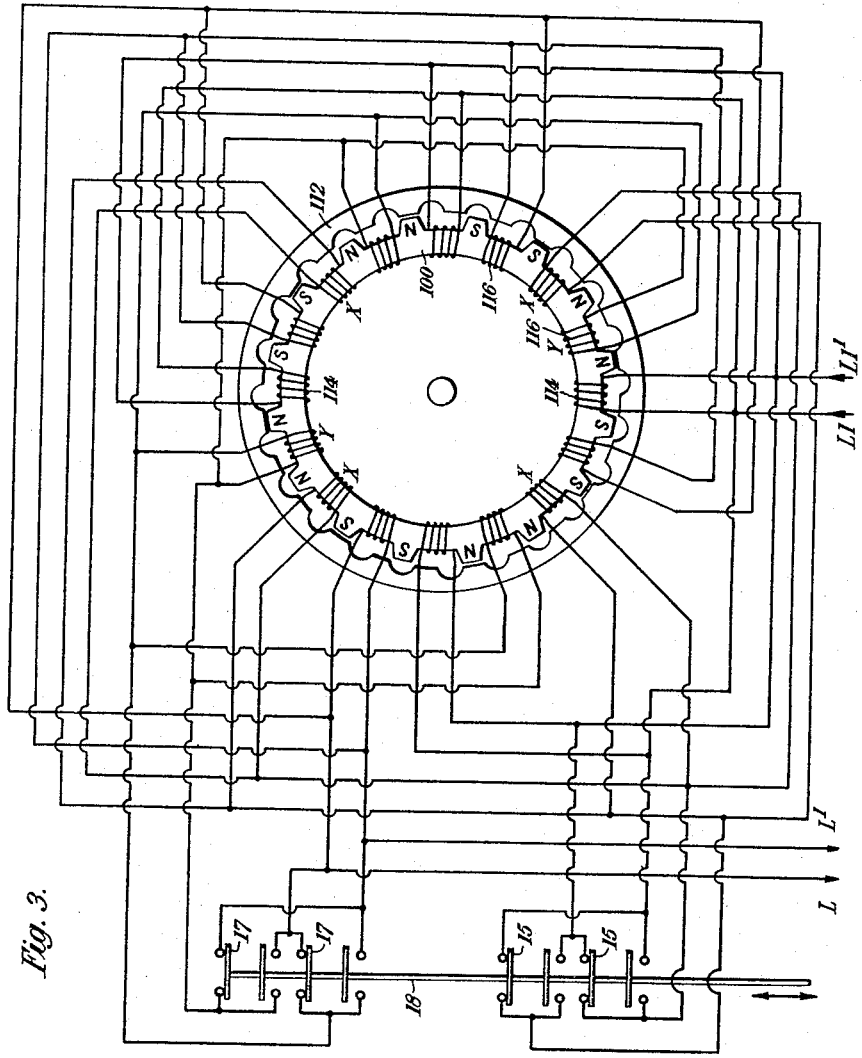
Figure 4:
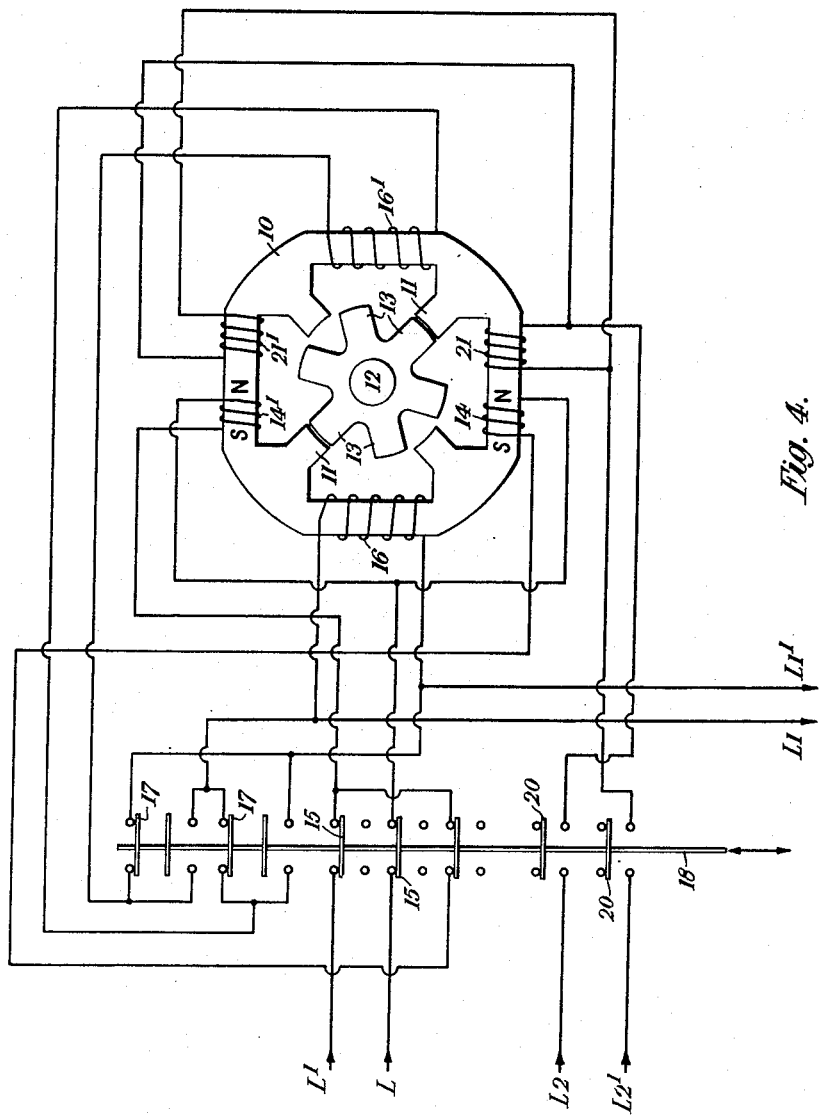
Figure 5:
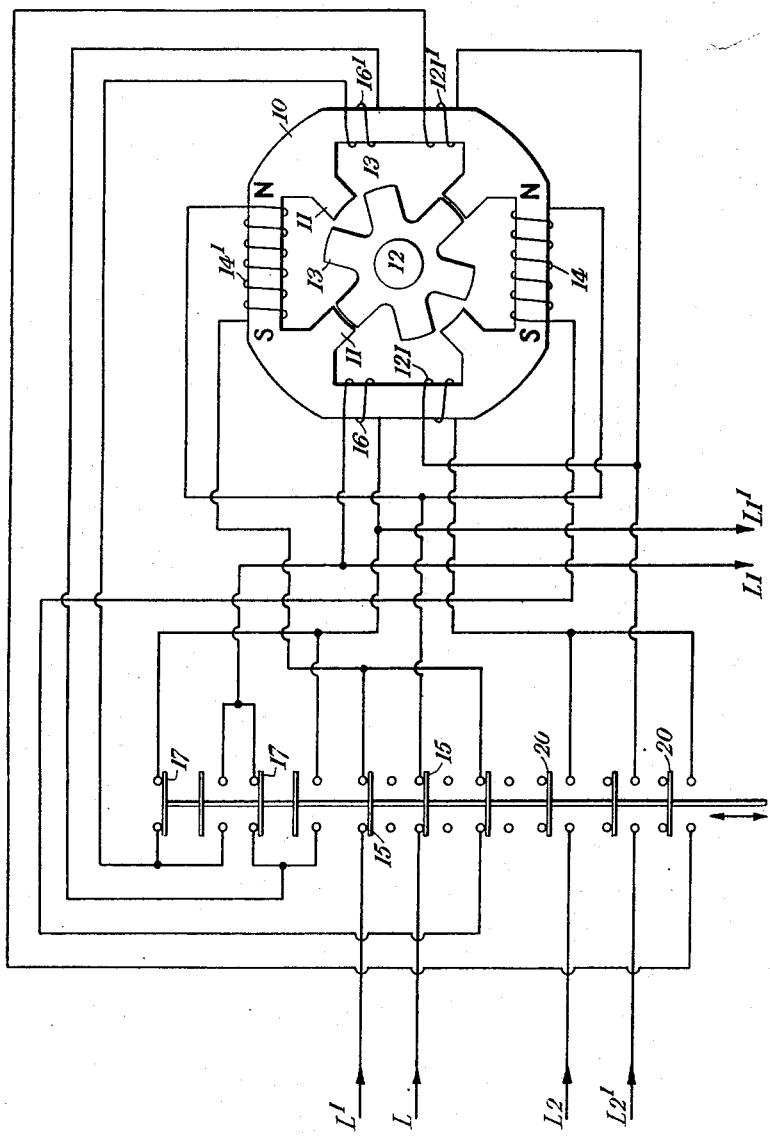

Some embodiments of the apparatus according to the invention will now be described in detail, by way of example, with reference to the accompanying drawings, in which:

Fig. 1 is a diagram of an apparatus having a stator external to the rotor, and with two pairs of coils on the stator, Fig. 2 is a diagram of an alternative apparatus in which the rotor is external to the stator, and eight pairs of coils are provided on the stator, Fig. 3 is a diagram showing a switching arrangement appropriate for the apparatus shown in Fig. 2, Fig. 4 is a diagram showing a further apparatus in which primary windings are provided on the limbs of the stator carrying the field coils, Fig. 5 is a diagram showing yet a further apparatus in which primary windings are provided on the limbs of the stator carrying the output coils.

Like reference characters denote like parts throughout the drawings.

The apparatus shown in Fig. 1 comprises an iron stator 10, having four poles 11. Mounted concentrically within the stator is an iron rotor 12 having six poles 13. Mounted on each of a pair of diametrically opposite limbs of the stator 10 are two field coils 14, 14', connected in parallel to a pair of input lines L, L'. The field coil 14' is connected to the input lines L, L' through a change over switch 15 which, when moved from the position shown to its alternative position, will reverse the polarity of the coil 14'. On the other pair of diametrically opposite limbs of the stator 10 are two output coils 16, 16' connected in parallel to a pair of output lines $L_1$, $L_1'$. The coil 16' is connected to the output lines through a change over switch 17 which, when moved from the position shown to its alternative position, will reverse the polarity of the coil 16'. The switches 15, 17 have a common operating rod 18 and are shown in the position appropriate for operation as an alternator. When moved down to make their alternative contacts, the switches 15, 17 are positioned appropriately for transformer operation.

In the position shown, when a D. C. input is applied to the lines L, L', the poles 11 of the stator will have the polarity indicated, and the flux through the portions of the stator wound with the output coils 16, 16' will be in the direction shown by the arrows. On rotation of the rotor 12 from the position shown, in which one pair of diametrically opposite stator poles 11 are opposite poles 13 of the rotor, the rotor poles 13 will be brought opposite the other pair of diametrically opposite stator poles 11, with the result that the magnetic flux through the output coils will be reversed. A. C. is thus produced in the output lines $L_1$, $L_1'$ on rotation of the rotor.

When the switches 15, 17 are moved to their alternative position, and the D. C. supply to the input lines L, L' is replaced by an appropriate A. C. supply, it will be clear that, having regard to the reversal of polarity of the coils 14', 16' the device will function as a transformer. By suitable choice of the A. C. input to the field coils, the alternating E. M. F. in the output lines $L_1$, $L_1'$, when the device is functioning as a transformer, may be made to have characteristics identical to those obtained when the device is used as an alternator.

In the construction shown in Figs. 2 and 3 the rotor 112 is external to the stator 100 and carries turbine blades 19. The stator is wound with eight field coils 114 and with eight output coils 116, the field coils alternating with the output coils. The polarity of the coils, as shown, is appropriate for operation as an alternator. For operation as a transformer the polarity of alternate field coils and of alternate output coils is reversed.

The switching arrangement is shown in Fig. 3. In the illustrated position of the switches 15, 17, the stator poles have the polarity indicated. When, however, the switches are moved to their alternative position, the polarity of the field coils marked X and of the output coils marked Y is reversed.

In the embodiment shown in Fig. 4, the switching mechanism includes an additional switch 20 on the actuating rod 18 and the stator carries a pair of primary windings 21, 21' wound on the same limbs as the field coils 14, 14'. In the position of the switching mechanism shown, the apparatus functions as an alternator as in the case of Fig. 1, the field coils 14, 14' being supplied with D. C. from the lines L, L' through the switch 15 and the output coils 16, 16' supplying A. C. to the output lines L₁, L₁' through the switch 17. When the switch mechanism is operated the switch 15 disconnects the field coils 14, 14' from the D. C. input, the switch 20 connects the primary windings 21, 21' to an A. C. input L₂, L₂' and the switch 17 reverses the polarity of the output coil 16'. The apparatus then functions as a transformer.

The apparatus shown in Fig. 5 is identical with that of Fig. 4 except that the primary windings 121, 121' for use in transformer operation are mounted on the same limbs of the stator as the output coils 16, 16'. As previously stated the primary windings may, in this case be constituted by portions of the output coils.

What I claim as my invention and desire to secure by Letters Patent is:

1. An inductor alternator, comprising a stator of inductive material having a number of salient poles, an unwound rotor of inductive material having salient poles exceeding in number the poles on the stator, input windings on the stator including a pair of parallel connected field coils, an output coil on the stator, said field coils establishing alternately on said stator, as the rotor rotates, oppositely directed series magnetic paths traversing said output coil, a D. C. input, an A. C. input, and switch mechanism movable from a first position in which said D. C. input is applied to said field coils and the A. C. input is disconnected from the stator to a second position in which said D. C. input is disconnected from the stator and said A. C. input is applied to one of said input windings to enable the apparatus to function as a transformer.

2. An inductor alternator, comprising a stator of inductive material having a number of salient poles, an unwound rotor of inductive material having salient poles exceeding in number the poles on the stator, a pair of parallel connected field coils on the stator, a pair of parallel connected output coils on the stator, said field coils being wound to establish on the stator, on connection of said field coils to a D. C. input, similarly directed series magnetic paths traversing said output coils which are periodically reversed in direction on rotation of the rotor, and switch mechanism operable to reverse the polarity of one coil of each pair with respect to the other coil of each pair, so that the apparatus may function as a transformer on application of an A. C. input to said field coils.

3. An inductor alternator, comprising a stator of inductive material having a number of salient poles, an unwound rotor of inductive material having salient poles exceeding in number the poles on the stator, a number of pairs of parallel connected field coils on the stator, a number of pairs of parallel connected output coils on the stator, said field and output coils being disposed alternately on the stator and said field coils being wound to establish on the stator, a connection of said field coils to a D. C. input, similarly directed series magnetic paths traversing said output coils which are periodically reversed in direction on rotation of the rotor, and switch mechanism operable to reverse the polarity of alternate field coils and also of alternate output coils, so that the apparatus may function as a transformer on application of an A. C. input to said field coils.

4. An inductor alternator as claimed in claim 3, wherein the rotor is external to the stator and comprising turbine blades on the rotor, said blades projecting from the rotor at the side thereof remote from the stator.

5. An inductor alternator, comprising a stator of inductive material having a number of salient poles, an unwound rotor of inductive material having salient poles exceeding in number the poles on the stator, a pair of parallel connected field coils on the stator, a pair of parallel connected output coils on the stator, a D. C. input, an A. C. input, a primary winding on said stator, and switch mechanism movable from a first position, in which said D. C. input is connected to the field coils and the A. C. input is disconnected from the stator, and a second position in which the D. C. input is disconnected from the stator, the A. C. input is applied to said primary winding and the polarity of one field coil and of one output coil is reversed, said coils being so wound that, in the first position of said switch mechanism, similarly directed series magnetic paths are established in the stator through the output coils, said paths periodically reversing in direction as the rotor is rotated, while in the second position of said switch mechanism the apparatus functions as a transformer.

6. An inductor alternator as claimed in claim 5, wherein the stator has four limbs, two opposite limbs carrying the output coils and the other two opposite limbs carrying the field coils, and comprising a primary winding on each field-coil-carrying limb of the stator, said switch mechanism connecting the A. C. input to both primary windings when moved to its second position.

7. An inductor alternator as claimed in claim 5, wherein the stator has four limbs, two opposite limbs carrying the output coils and the other two opposite limbs carrying the field coils, and comprising a primary winding mounted on each output-coil-carrying limb of the stator, said switch mechanism connecting the A. C. input to both primary windings when moved to its second position.

8. An inductor alternator, comprising a stator of inductive material having a number of salient poles, an unwound rotor of inductive material having salient poles exceeding in number the poles on the stator, means on the rotor for imparting rotation thereto when exposed to an airstream, input windings on the stator including a pair of parallel connected field coils, an output coil on the stator, said field coils establishing alternately on said stator, as the rotor rotates, oppositely directed series magnetic paths traversing said output coil, a D. C. input, an A. C. input, and switch mechanism movable from a first position in which said D. C. input is applied to said field coils and the A. C. input is disconnected from the stator to a second position in which said D. C. input is disconnected from the stator and said A. C. input is applied to one of said input windings to enable the apparatus to function as a transformer.

9. An inductor alternator, comprising a stator of inductive material having a number of salient poles, an unwound rotor of inductive material having salient poles exceeding in number the poles on the stator, means on the rotor for imparting rotation thereto when exposed to an airstream, a pair of parallel connected field coils on the stator, a pair of parallel connected output coils on the stator, said field coils being wound to establish on the stator, on connection of said field coils to a D. C. input, similarly directed series magnetic paths traversing said output coils which are periodically reversed in direction on rotation of the rotor, and switch mechanism operable to reverse the polarity of one coil of each pair with respect to the other coil of each pair, so that the apparatus may function as a transformer on application of an A. C. input to said field coils.

10. An inductor alternator, comprising a stator of inductive material having a number of salient poles, an unwound rotor of inductive material having salient poles exceeding in number the poles on the stator, means on the rotor for imparting rotation thereto when exposed to an airstream, a pair of parallel connected field coils on the stator, a pair of parallel connected output coils on the stator, a D. C. input, an A. C. input, a primary winding on said stator, and switch mechanism movable from a first position, in which said D. C. input is connected to the field coils and the A. C. input is disconnected from the stator, and a second position in which the D. C. input is disconnected from the stator, the A. C. input is applied to said primary winding and the polarity of one field coil and of one output coil is reversed, said coils being so wound that, in the first position of said switch mechanism, similarly directed series magnetic paths are established in the stator through the output coils, said paths periodically reversing in direction as the rotor is rotated, while in the second position of said switch mechanism the apparatus functions as a transformer.

References Cited in the file of this patent

UNITED STATES PATENTS

| 2,097,577 | Seitner | Nov. 2, 1937 |
| 2,399,905 | Baumann | May 7, 1946 |

FOREIGN PATENTS

| 570,246 | Great Britain | June 28, 1945 |
| 132,703 | Switzerland | July 16, 1929 |